W. J. STEELE.
ATTACHMENT FOR LISTERS.
APPLICATION FILED DEC. 10, 1909.
976,311. Patented Nov. 22, 1910.
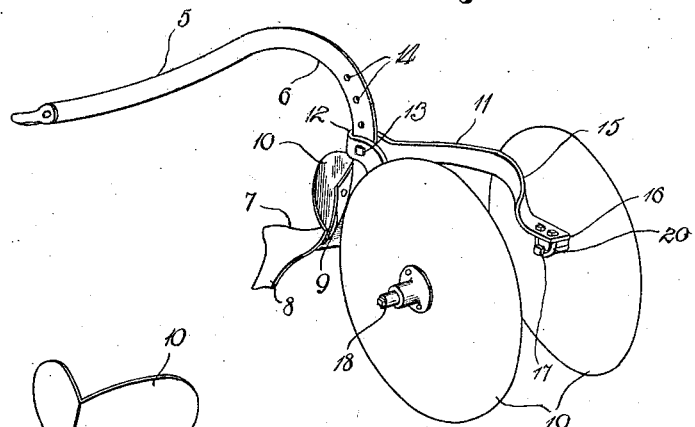
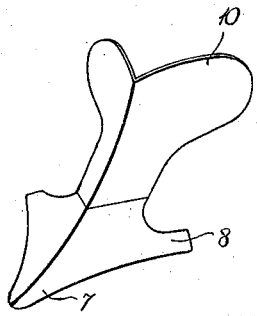
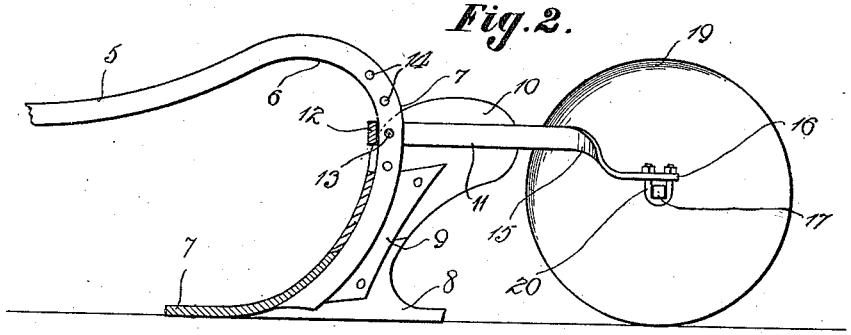
Inventor
William J. Steele.
Witnesses

UNITED STATES PATENT OFFICE.

WILLIAM J. STEELE, OF SPEARVILLE, KANSAS.

ATTACHMENT FOR LISTERS.

976,311.     Specification of Letters Patent.     Patented Nov. 22, 1910.

Application filed December 10, 1909. Serial No. 532,373.

*To all whom it may concern:*

Be it known that I, WILLIAM J. STEELE, a citizen of the United States, residing at Spearville, in the county of Ford, State of Kansas, have invented certain new and useful Improvements in Attachments for Listers; and I do hereby declare the following to be a full, clear, and exact description of the invention, such as will enable others skilled in the art to which it appertains to make and use the same.

The invention relates to a lister plow and more particularly to the class of attachments for listers.

The primary object of the invention is the provision of a lister attachment in which the share and mold boards are peculiarly constructed so as to close an adjacent open furrow and also of roller disks so disposed in rear of the mold boards as to move sufficient soil to close a furrow just opened by the mold boards.

Another object of the invention is the provision of an attachment in which the revolving disks may be adjusted so as to permit the same to travel close together or in spread relation to each other.

A further object of the invention is the provision of a plow attachment which is simple in construction, thoroughly reliable and efficient in operation, and inexpensive in the manufacture.

With these and other objects in view, the invention consists in the construction, combination and arrangement of parts, as will be hereinafter more fully described in detail, illustrated in the accompanying drawings, which disclose the preferred form of embodiment of the invention to enable those skilled in the art to carry the invention into practice and as pointed out in the claim hereunto appended.

In the drawings:—Figure 1 is a perspective view of a plow with the attachment mounted thereon. Fig. 2 is a longitudinal sectional view. Fig. 3 is a perspective elevation of the share and mold board removed from the plow standard.

Similar reference characters indicate corresponding parts throughout the several views in the drawings.

In the drawings there is shown an ordinary lister plow comprising a beam 5, the rear end of which is curved rearwardly and downwardly as at 6, to form a standard to the lower end of which is connected a plow share 7, the latter having outwardly diverging wings 8, and immediately above this share is a cast or steel frog 9, to which are attached the steel mold boards 10, the latter being disposed at opposite sides with respect to the standards 6, of the lister beam. The cast or steel frog being secured to the standard 6, in the usual manner.

Mounted at opposite sides of the standard 6, are rearwardly directed outwardly converging arms 11, the forward ends of which are formed with right angular inturned extremities 12, and these arms are held secured to the standard 6, by a bolt 13, which latter is adjustable on the standard 6, by engagement in any one of a series of openings 14, therein. The arms 11, are twisted as at 15, to form flat horizontal bearing terminals 16, the latter supporting adjustable clips 17, encircling stud axles 18, for detachably securing the same to the arms and these axles 18, have journaled thereon revoluble concaved disks 19, which latter travel in rear of the mold boards. These disks 19 are shown as disposed outside of the arms 11, although the said disks may be mounted between the said arms so as to have the same travel in close relation to each other in contradistinction to their spread relation when mounted at the outside of the arms supporting the same. Between the bearing terminals 16, and the stud axles 18, are filling blocks 20, the latter being held by the clips 17, adjustably mounted in the bearing terminals 16, of the supporting arms.

In operation, the share 7, breaks the soil and the mold boards 10, lift and turn over the soil into adjacent open furrows. The revolving disks serve to move sufficient soil inwardly to close small furrows just opened by the narrow long throated mold boards.

What is claimed is:—

The combination with a lister plow beam having a share and mold board connected thereto, of a bracket formed from a single piece of material bent to form rearwardly converging arms with a contracted portion centrally between the free ends thereof, the said contracted portion engaging the beam, a bolt member passed through the said contracted portion and the beam to detachably and adjustably connect the said bracket to the beam, the free ends of the arms being twisted to provide horizontal bearing terminals stud axles clips encircling said stud axles and engaging the horizontal bearing terminals of the arms and revoluble concaved disks journaled on said axles.

In testimony whereof, I affix my signature, in presence of two witnesses.

WILLIAM J. STEELE.

Witnesses:
    EUGENE E. SOULE,
    HARVEY C. BAIRD.